United States Patent [19]

Taylor

[11] Patent Number: 5,152,185

[45] Date of Patent: Oct. 6, 1992

[54] TRAM TRANSMISSION

[76] Inventor: John C. Taylor, Rte. 1 Box 128-A, Cumberland Gap, Tenn. 37724

[21] Appl. No.: 579,060

[22] Filed: Sep. 7, 1990

[51] Int. Cl.$^5$ .................... F16H 29/20; F16H 57/04
[52] U.S. Cl. .................. 74/89.21; 74/421 A; 74/467
[58] Field of Search ............ 74/421 R, 421 A, 89.21, 74/467; 184/6.4, 108

[56] References Cited

U.S. PATENT DOCUMENTS

| | | | |
|---|---|---|---|
| 2,389,624 | 11/1945 | Knox et al. | 74/421 R X |
| 3,111,864 | 11/1963 | Christian | 74/421 A X |
| 3,187,209 | 6/1965 | Schmitter | 74/421 A X |
| 3,347,341 | 10/1967 | Aurea | 184/108 |
| 4,147,071 | 4/1979 | Scribner | 74/421 A X |
| 4,526,252 | 7/1985 | Hirano | 74/421 A X |
| 4,593,572 | 6/1986 | Linley, Jr. | 74/467 X |

FOREIGN PATENT DOCUMENTS 1410044 10/1975 United Kingdom ............ 74/421 A

*Primary Examiner*—Allan D. Herrmann
*Assistant Examiner*—Julie Krolikowski

[57] ABSTRACT

An improved tram transmission (10) for transferring power produced by a tram motor (54) to a tram crawler chain (66) more efficiently than transmission of prior art. The improved tram transmission (10) includes a motor drive shaft receptacle (12) which is dimensioned for receiving the drive shaft (56) of a tram motor (54). A plurality of cooperating pairs of gears (70) are provided to cooperate with the motor drive shaft receptacle (12) such that the power produced by the motor (54) may be transferred to the crawler chain (66). A plurality of shafts (73) are included to support the gears (70) and are held in place with ball bearings (183). The main shaft (76) carries a hub (158) which includes a plurality of sprockets (166) for engaging the crawler chain (66). A housing (18) is provided for shielding the components (12, 70, and 183) from debris and moisture and for containing lubricant (68) for the gears (70), shafts (73) and bearings (183).

12 Claims, 5 Drawing Sheets

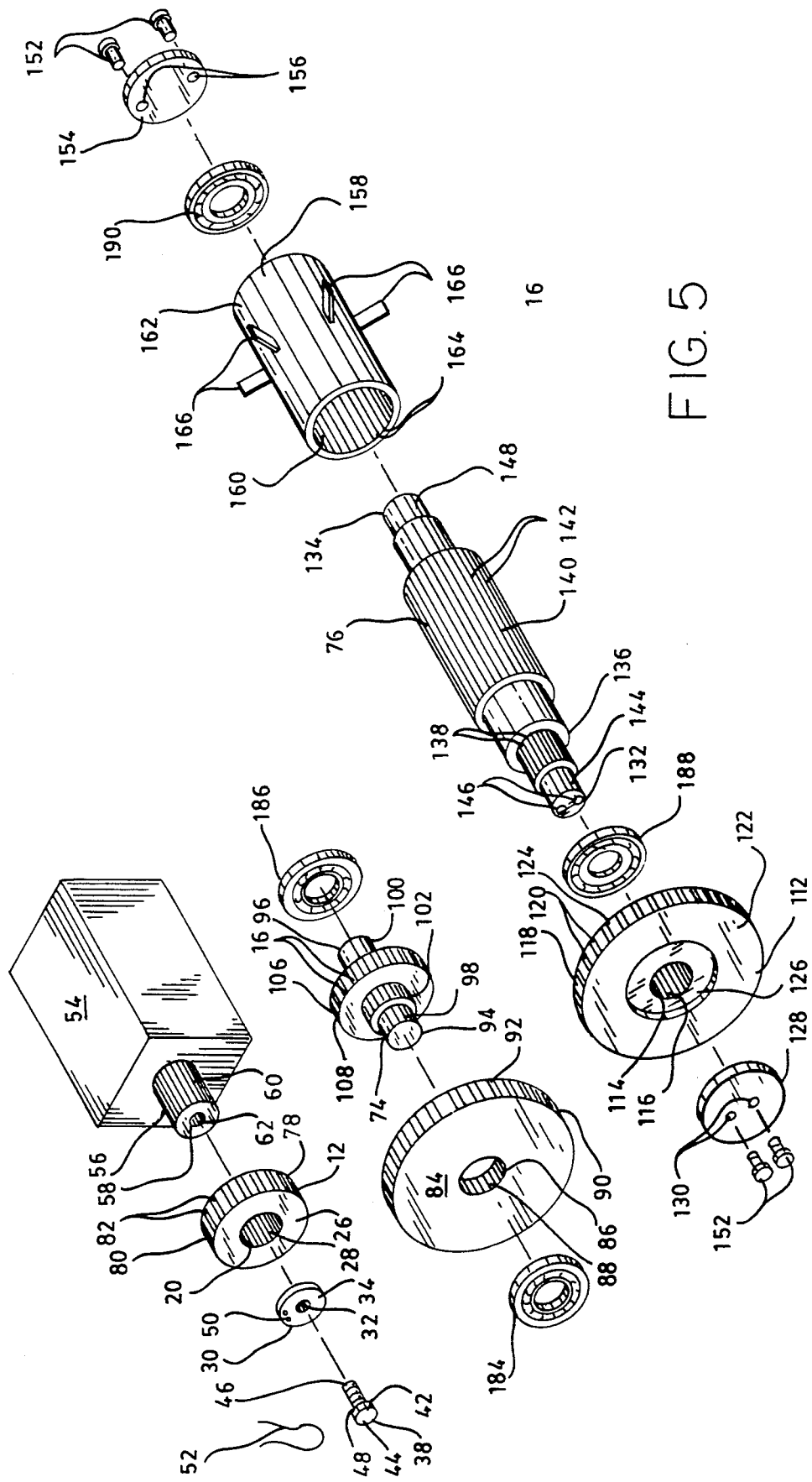

TRAM TRANSMISSION

TECHNICAL FIELD

This invention relates to the field of mining. More specifically it relates to an improved transmission for moving a mining tram in and out of a mine shaft, the improved transmission being protected from debris to increase productivity.

BACKGROUND ART

In the field of mining, trams are employed to move coal hoppers in and out of mines. The trams available at the present typically employ a transmission which includes a pair of sprocket wheels, the first of which cooperates with a worm gear which is rotated by a motor, and the second is connected to the first with a chain. The second sprocket wheel is also connected to a drive shaft which in turn engages a caterpillar chain which is supported by the mine floor, thus when the motor is on, the worm gear turns the first sprocket wheel which engages the chain and thereby turns the second wheel, the second wheel then turning the drive shaft thus moving the caterpillar chain and hence the tram.

This transmission is inefficient in that a large percentage of the power produced by the motor is lost in the worm gear, thereby requiring a much larger power output to move the tram, with a resulting speed lower than desired for the corresponding power output. Due to this inefficiency the tram may easily bog down when it is driven into mud or the like. In this configuration the relative size of the first and second sprocket wheels determine the speed of the tram in relation to the rotational velocity of the motor. Typically the two sprocket wheels are the same size, thereby rotating the drive shaft at the same speed as the motor. This creates the need for a motor with a lower rotational velocity so that the tram may crawl at the desired speed, this motor being less efficient than a motor producing the same amount of torque but with a faster rotational velocity. The sprockets are connected to shafts which are typically of a relatively small diameter as compared to the sprocket wheels, which inhibits premature breaking of the shafts, due to the transference of torque from a large diameter to a relatively small diameter. In this atmosphere, the chain is easily clogged with coal and other debris and therefore is easily broken. The breakage of the sprocket wheel shafts and the chain cause undue expense for repair and lost operation time.

Therefore, it is an object of this invention to provide a means for moving a tram into and out of a mine shaft while employing a more efficient motor.

It is also an object of this invention to provide a means whereby the torque produced by the motor is transferred to the drive shaft of the tram more efficiently thereby requiring a lower torque output from the motor.

Another object of this invention is to provide a means whereby the rotational velocity of the drive shaft may be reduced in relation to the rotational velocity of the motor such that a motor with a higher rotational velocity may be employed.

Still another object of this invention is to provide a means whereby the components are shielded from debris and moisture.

Yet another object of this invention is to provide a means whereby the gears and bearings may be lubricated, with the lubricant being protected from contamination, thereby increasing the life of the components due to less wear.

DISCLOSURE OF THE INVENTION

Other objects and advantages will be accomplished by the present invention which serves to transfer power generated by a motor to the crawler chain of a tram in such a way as to increase the efficiency of the motor and the transmission. The improved tram transmission of the present invention is fabricated from a rigid material such as steel or aluminum. The improved tram transmission includes a motor engaging means which receives a drive shaft from a motor. In the preferred embodiment the motor engaging means has a cylindrical configuration with a splined inner face dimensioned to receive a splined drive shaft.

A speed reducing means for reducing the velocity of the tram with respect to the rotational velocity of the motor is connected to the motor engaging means. The speed reducing means of the preferred embodiment includes at least one pair of cooperating gears, at least one intermediate shaft and at least one main shaft. Each pair of cooperating gears includes a gear which acts as a pinion and turns the second gear of the pair. In the preferred embodiment, the first pinion is carried by the motor engaging means and is splined to cooperate with the first gear. The first gear of the preferred embodiment has a cylindrical configuration with an inner face which is splined to receive the intermediate shaft, the intermediate shaft being splined. The outer face of the first gear is splined. The intermediate shaft carries the second pinion and is secured proximate each end with ball bearings. The second pinion of the preferred embodiment is splined to cooperate with the second gear, the second gear having a cylindrical configuration with a splined outer face. The inner face of the second gear is splined to cooperate with a first splined portion of the main shaft. In the preferred embodiment, the main shaft includes a second splined portion to cooperate with a hub and is secured proximate each end with ball bearings.

A crawler engaging means is connected to the speed reducing means and engages a crawler chain such that as the speed reducing means is rotated, the crawler chain is pulled about the crawler engaging means, thus moving the tram. The crawler engaging means of the preferred embodiment includes a hub which has a tubular configuration with a splined inner face and carries a plurality of sprockets about the outer face, the sprockets being dimensioned to engage a crawler chain.

A housing is included to protect the motor engaging means and speed reducing means from debris and moisture to reduce the damage caused by such and to contain lubricant for the gears, shafts and bearings. The housing is connected to the tram with spaced bolts, welds or the like. In the preferred embodiment, the housing is connected to the tram by welding all around and includes at least one enclosure. The exterior of the housing of the preferred embodiment is dimensioned such that the crawler engaging means and crawler chain may be received. Each enclosure includes at least one through hole, each hole being dimensioned to receive one end of the speed reducing means main shaft and provided with a lubricant seal to prevent leakage of the lubricant. Each enclosure further includes a lubricant receptacle for introducing lubricants. The housing includes at least one lubricant gauge for monitoring the level of lubricant within the housing.

BRIEF DESCRIPTION OF THE DRAWINGS

The above mentioned features of the invention will become more clearly understood from the following detailed description of the invention read together with the drawings in which:

FIG. 5 illustrates an exploded view of the transmission shown in FIG. 4.

BEST MODE FOR CARRYING OUT THE INVENTION

Figure 1:
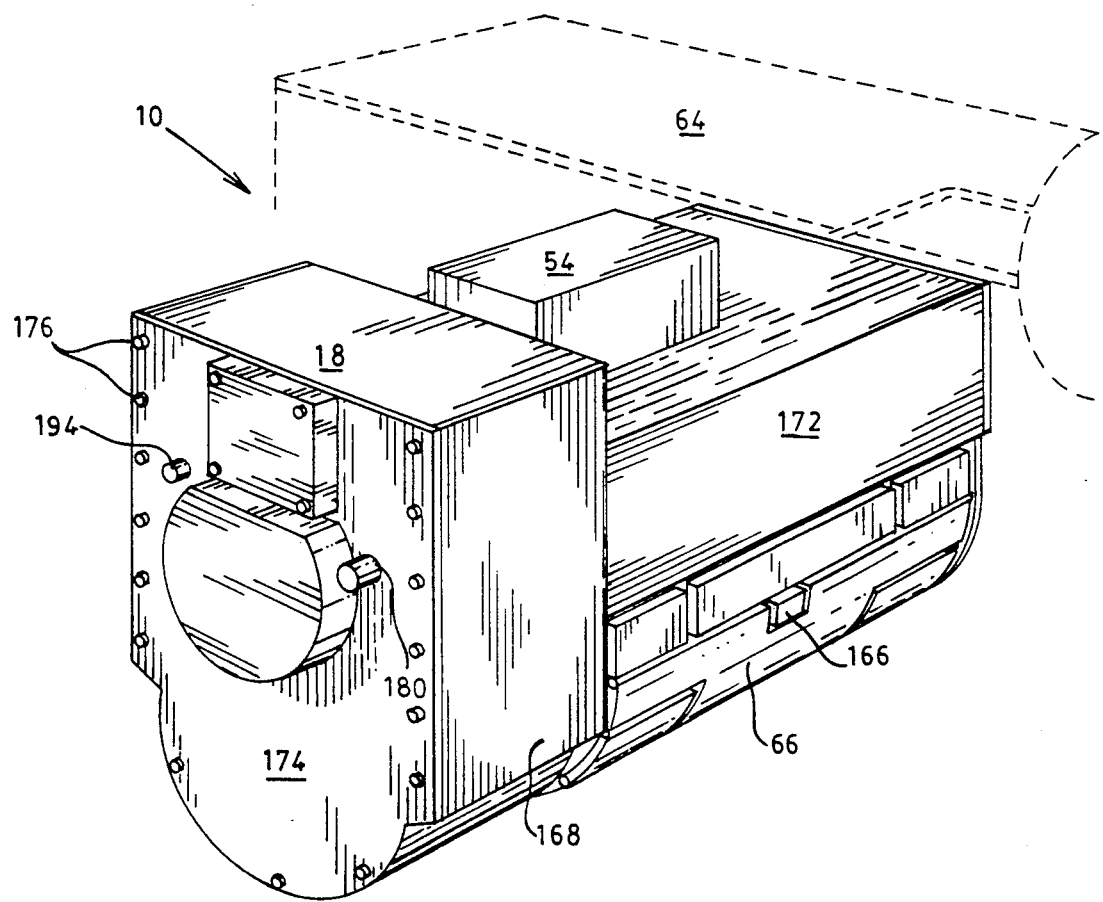
FIG. 1 is a perspective view of the improved tram transmission constructed in accordance with several features of the present invention shown engaging a crawler chain.
Figure 2:
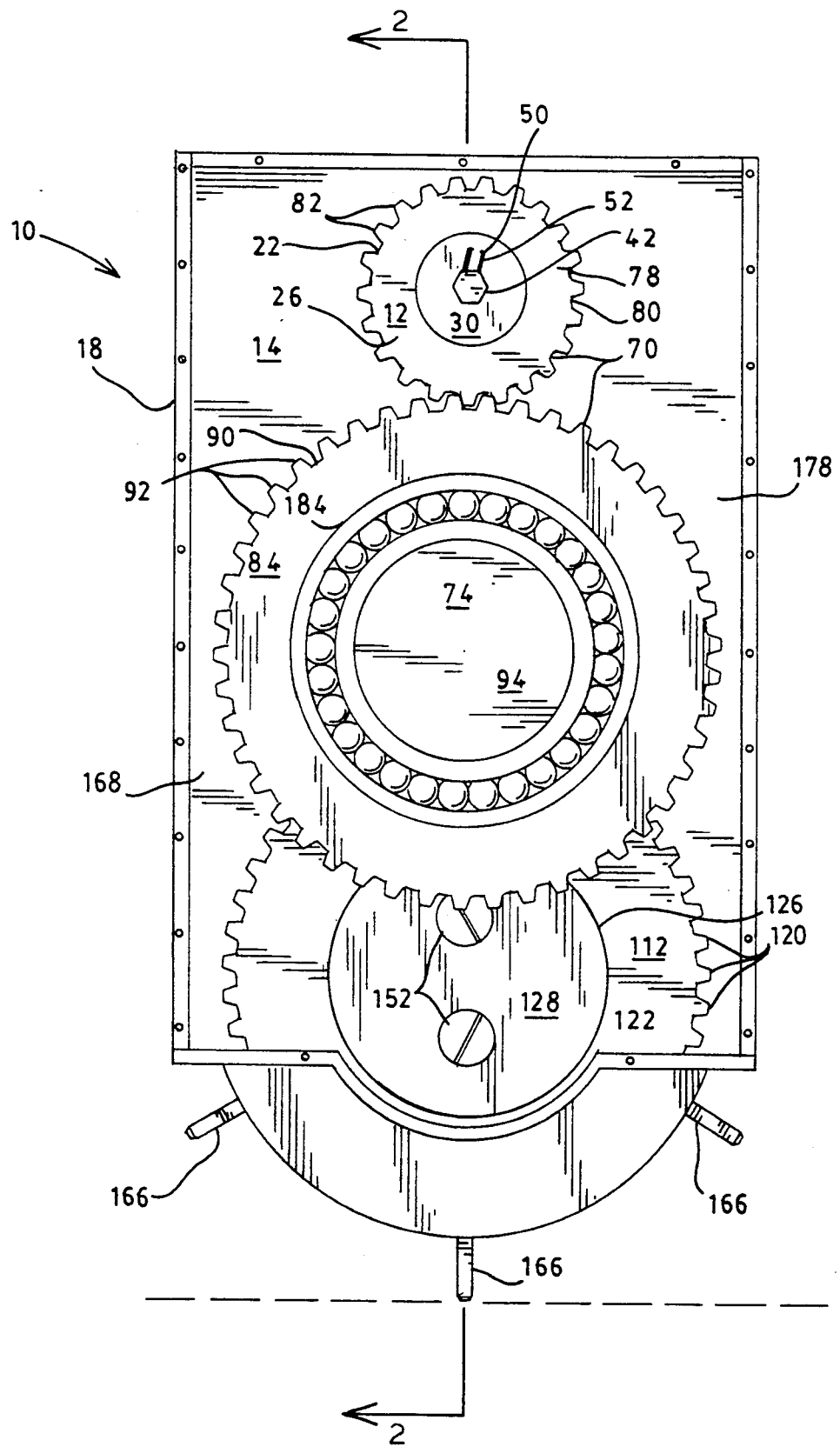
FIG. 2 illustrates a front elevation view of the transmission shown in FIG. 1 showing the front plate removed.
Figure 3:
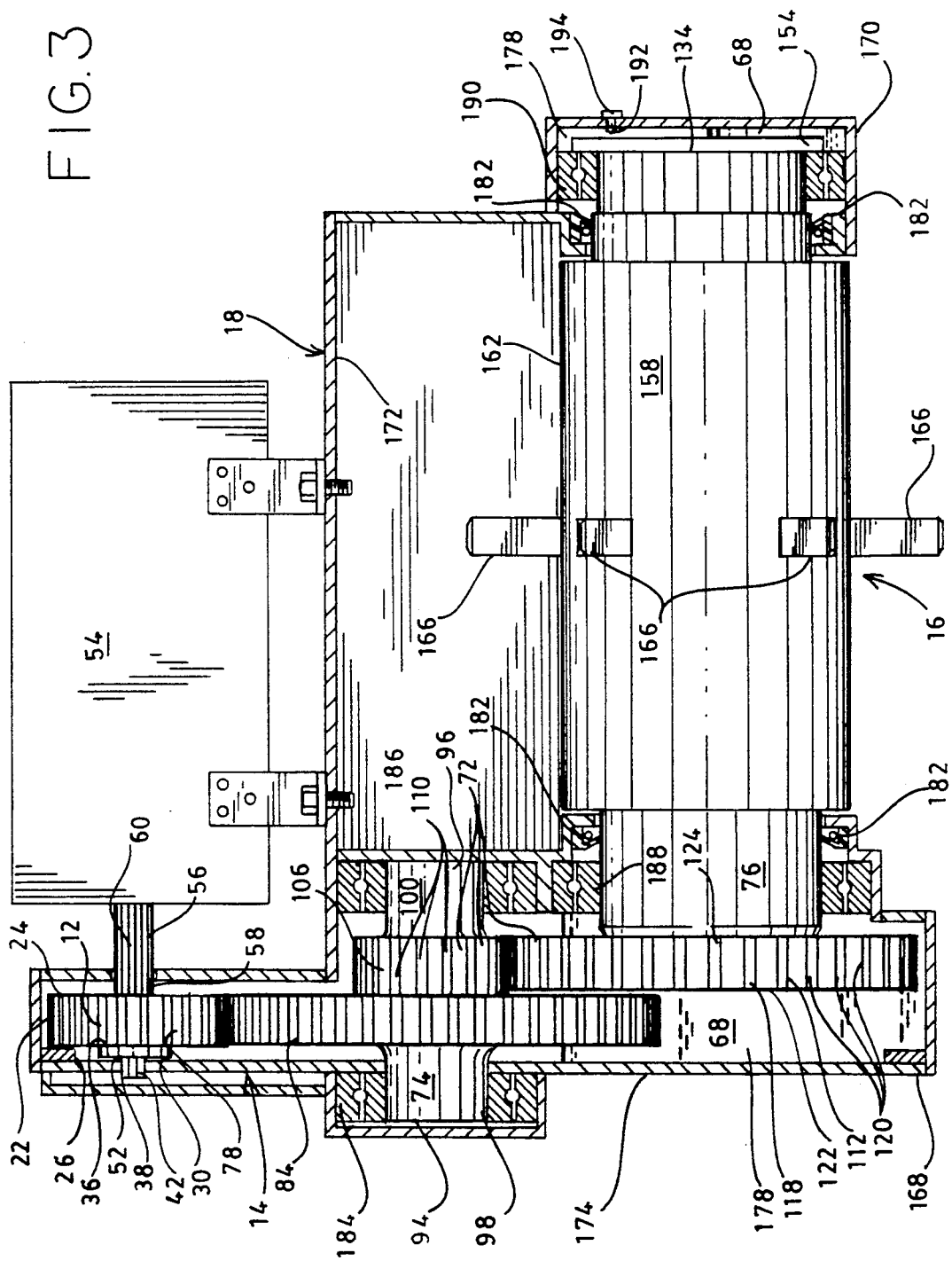
FIG. 3 illustrates a side elevation view of the transmission shown in FIG. 1, shown partially in section taken at 2—2 of FIG. 2.
Figure 4:
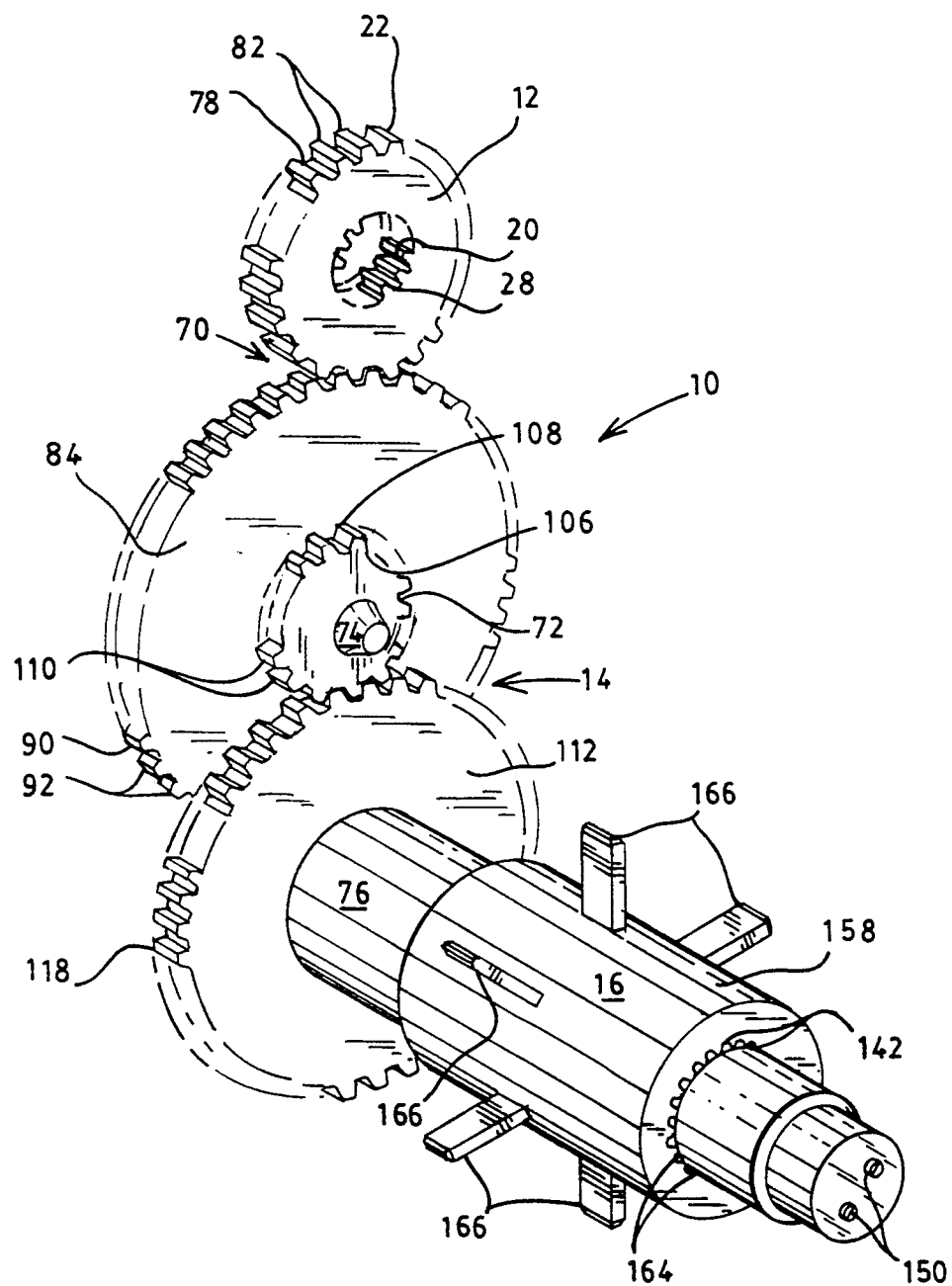
FIG. 4 is a perspective view of the back of the transmission shown in FIG. 1 shown without the housing.

An improved tram transmission incorporating various features of the present invention is illustrated generally at 10 in the figures. The tram transmission 10 is designed to efficiently transfer power from a motor 54 to a crawler chain 66 of a mining tram 64 while protecting the transmission 10 from debris and moisture.

The improved tram transmission 10 includes a motor engaging means 12 which is fabricated from a rigid material such as steel or aluminum and is dimensioned to closely receive a drive shaft 56 of a motor 54. In the preferred embodiment the motor engaging means 12 has a substantially cylindrical configuration with an inner face 20, an outer face 22, a first end 24 and a second end 26. The inner face 20 of the preferred embodiment includes a plurality of longitudinal splines 28 dimensioned to cooperate with an equal number of splines 60 included on a drive shaft 56 of a motor 54. In the preferred embodiment, the motor drive shaft 56 includes a first end 58 which is received by the first end 24 of the motor engaging means 12 and held in place by a fixing means 38 connected to the second end 26 of the motor engaging means 12. The fixing means 38 of this embodiment includes a bolt 42, a cap plate 30 including an opening 32 dimensioned to receive the threaded portion 46 of the bolt 42, and a threaded hole 62 opening on the first end 57 of the motor drive shaft 56. The cap plate 30 of this embodiment includes a first face 34 and a second face 36 and is dimensioned to cover at least a portion of the second end 26 of the motor engaging means 12. The cap plate 30 of the preferred embodiment is held in place with a stud 40, the stud 40 being connected to the second face 36 of the cap plate 30 and the inner face 36 of the motor engaging means 12. The bolt 42 includes a through hole 48 opening on the head portion 44 and the cap plate 30 includes a through hole 50, the bolt hole 48 and the plate hole 50 being positioned such that a wire 52 may be inserted and tied such that the bolt 42 is restricted from movement with respect to the cap plate 30.

A speed reducing means 14 is included to reduce the speed of the tram 64 with respect to the rotational velocity of the motor drive shaft 56. The speed reducing means 14 is fabricated from a rigid material such as steel or aluminum and includes a plurality of pairs of cooperating gears 70, at least one intermediate shaft 74 and at least one main shaft 76. In the preferred embodiment, the speed reducing means 14 includes a first cooperating pair of gears 70, a second cooperating pair of gears 72, an intermediate shaft 74 and a main shaft 76.

The first cooperating pair of gears 70 in the preferred embodiment includes a first pinion 78 and a first gear 84. The first pinion 78 includes the outer face 22 of the motor engaging means 12 and has a selected number of equidistantly spaced splines 82. The first gear 84 has a wheel configuration with an inner face 86 and an outer face 90, the inner face 86 including a plurality of longitudinal splines 88 dimensioned to receive the intermediate shaft 74 and the outer face 90 including a selected number of equidistantly spaced splines 92. The first gear outer face splines 92 cooperate with the first pinion splines 82 such that when the first pinion 78 is rotated due to the revolution of the motor drive shaft 56, the first gear 84 revolves with a rotational velocity equal to the rotational velocity of the motor 84 multiplied by the number of first pinion splines 78 and divided by the number of first gear outer face splines 92.

The intermediate shaft 74 of the preferred embodiment has a first end 94 and a second end 96. The intermediate shaft 74 includes a splined portion 102 proximate the first end 94 dimensioned to cooperate with the longitudinal splines 88 included on the inner face 86 of the first gear 84 such that when the first gear 84 is rotated, the intermediate shaft 74 is rotated at a velocity equal to the rotational velocity of the first gear 84. The intermediate shaft 74 further includes a first extended portion 98 extending axially from the first end 94 and a second extended portion 100 extending axially from the second end 96.

The second cooperating pair of gears 72 of the preferred embodiment includes a second pinion 106 and a second gear 112. The second pinion 106 has a wheel configuration with an outer face 108 including a selected number of equidistantly spaced splines 110, and is carried by the intermediate shaft 74 such that as the first gear 84 is rotated at a selected rotational velocity, the second pinion 106 is rotated at the same rotational velocity. The second gear 112 has a wheel configuration with an inner face 114, an outer face 118, a first end 122 and a second end 124. The second gear inner face 114 includes a plurality of longitudinal splines 116 dimensioned to receive the main shaft 76. The second gear 112 includes a recess 126 opening on the first end 122, the recess 126 being concentric with the second gear 112 and dimensioned to receive a first end cap 128. The second gear outer face 118 includes a selected number of equidistantly spaced splines 110 which cooperate with the second pinion splines 110 such that when the second pinion 106 is rotated due to the rotation of the first gear 84, the second gear 112 is rotated with a rotational velocity equal to the rotational velocity of the first gear 84 multiplied by the selected number of second pinion splines 110 and divided by the selected number of second gear outer face splines 120.

The main shaft 76 of the preferred embodiment has a selected diameter and includes a first end 132, a second end 134, a first splined portion 136, a second splined portion 140, a first extended portion 144 and a second extended portion 148. The first extended portion 144 extends axially from the first end 132 and carries the first splined portion 136. The first splined portion 136 includes a plurality of longitudinal splines 138 dimensioned to be received by and cooperate with the second gear inner face 114 such that when the second gear 112 is rotated the main shaft 76 is also rotated at an equal rotational velocity. The diameter of the first extended portion 144 is smaller than the diameter of the main shaft 76 such that the second gear 112 is prohibited from moving axially toward the second end 134 beyond the first splined portion The first extended portion 144 includes a plurality of holes 146 opening on the first end 132, each hole 146 being dimensioned to receive a fastener 152. A first end cap 128 is included to be received by the second gear recess 126, the first end cap 128 including at least one hole 130 dimensioned to cooperate with the first extended portion holes 146 such that the first end cap 128 may be fixed thereby fixing the second gear 112 to the main shaft 76. The second splined portion 140 includes a plurality of equidistantly-spaced longitudinal splines 142 and is located proximate the middle of the main shaft 76. The second extended portion 146 extends axially from the second end 134 of the main shaft 76 and has a diameter which is smaller than the diameter of the main shaft 76. A plurality of holes 150 opening on the second end 134 are included, each hole 150 being dimensioned to receive a fastener 152. A second end cap 154 is also provided and includes a plurality of holes 156 dimensioned to cooperate with the holes 134 in the second end 134 of the main shaft 76 such that the second end cap 154 may be fastened to the main shaft second end 134 in order to secure the main shaft second end 134.

A crawler engaging means 16 is included and is connected to the speed reducing means 14. The crawler engaging means 16 of the preferred embodiment is fabricated from a rigid material such as steel or aluminum and includes a hub 158 with a cylindrical configuration and a plurality of sprockets 166 for engaging a crawler chain 66. The hub includes an inner face 160 and an outer face 162, the inner face 160 including a plurality of longitudinal splines 164 dimensioned to cooperate with the second splined portion 140 of the main shaft 76 such that the crawler engaging means 16 is rotated as the main shaft 76 is rotated. The sprockets 166 are connected to the outer face of the hub 158 and extend outwardly at a perpendicular angle from the longitudinal axis. The sprockets 166 are equidistantly spaced about the center of the hub 158 such that they may cooperate with a crawler chain 66 to mobilize the tram 64.

A housing 18 is included to support, receive lubricant for, and shield the motor engaging means 12 and speed reducing means 14. The housing 18 is fabricated from a rigid material such as steel or aluminum and is connected to the tram 64. In the preferred embodiment, the housing 18 is connected to the tram 64 by welding all around. The housing 10 includes at least one enclosure 168 dimensioned to receive the components of the transmission 10. In the preferred embodiment, a first enclosure 168 and a second enclosure 170 are included and are connected by a connecting member 172. The first enclosure 168 is dimensioned to contain the first cooperating pair of gears 70, the second cooperating pair of gears 72, the intermediate shaft 74 and the first end 132 of the main shaft 76. The first enclosure 168 includes a selectively removable plate 174 for assembly of the transmission 10 and for servicing, the plate 174 being attached with a plurality of spaced bolts 176. The second enclosure 170 is dimensioned to receive the second end 134 of the main shaft 76. The connecting member 172 is dimensioned to connect the first enclosure 168 and the second enclosure 170 such that the crawler engaging means 16 and crawler chain 66 may be received between the first and second enclosures 168 and 170. Lubricant receptacles 178 are provided on the first enclosure 168 and the second enclosure 170, each receptacle 178 defining a through hole 192 and including a cap bolt 194 to selectively open and close the receptacle 178. The preferred embodiment includes a lubricant level gauge 180 in order to measure the lubricant 78 within the housing 78. The first enclosure 168 includes a lubricant seal 182 to prevent leakage of lubricant 68, the seal 182 being located to closely fit around the main shaft 76 proximate the first end 132. The second enclosure 170 includes a lubricant seal 182 located to fit around the main shaft 76 proximate the second end 134.

The improved tram transmission 10 includes a plurality of bearings 184 to assist in the rotation of the intermediate shafts 74 and the main shaft 76. In the preferred embodiment, ball bearings 184, 186, 188 and 190 are included proximate the first and second ends 94 and 96 of the intermediate shaft 74 and the first and second ends 132 and 134 of the main shaft 76. Each bearing 184, 186, 188 and 190 is connected to the housing 18 and is dimensioned to closely receive the respective shaft end 94, 96, 132 and 134.

From the foregoing description, it will be recognized by those skilled in the art that an improved tram transmission offering advantages over the prior art has been provided. Specifically, the improved tram transmission provides a means for applying the power produced by a tram motor to a tram crawler chain such that a more efficient motor may be used and greater productivity may be achieved. The improved tram transmission is provided with a more efficient means of transferring the power such that a greater work efficiency is also achieved. A means for protected the transmission is also incorporated such that the transmission is not adversely affected by debris that normally harms transmissions of prior art, thus increasing the life of the transmission components thus saving time and money.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. An improved tram transmission for mobilizing a mining tram within a mine shaft comprising:

a motor engaging means for receiving the drive shaft of a motor;

a speed reducing means connected to said motor engaging means for regulating the speed of said tram;

a crawler engaging means connected to said speed reducing means for engaging a caterpillar type chain proximate one side of said mining tram to move said side of said tram along a support surface, said crawler engaging means being positioned proximate said support surface and including a plurality of radially spaced sprockets for engaging proximately the midpoint of the width of said caterpillar type chain; and a housing connected to said tram and encasing said motor engaging means and said speed reducing means for protecting said motor engaging means and said speed reducing means for debris and moisture, said housing defining at least first and second lubricant reservoirs, said first lubricant reservoir for receiving a first selected lubricant and said second reservoir for receiving a second selected lubricant.

2. The improved tram transmission of claim 1 wherein said speed reducing means includes a plurality of shafts and a plurality of gears, each of said gears being connected to one of said shafts and having a selected diameter with a selected number of teeth equidistantly spaced about the circumference of said gear.

3. The improved tram transmission of claim 2 wherein said speed reducing means further includes a plurality of bearings located proximate each end of each of said shaft and connected to said housing for limiting the movement of said shafts to rotation about the elongated axis.

4. The improved tram transmission of claim 1 wherein said housing includes at least one opening which may be selectively opened and closed whereby lubricant may be introduced to lubricate said gears and said bearings.

5. The improved tram transmission of claim 4 wherein said housing further includes at least one lubricant seal to prevent said lubricant from leaking from said housing.

6. The improved tram transmission of claim 4 wherein said housing further includes a lubricant gauge for measuring the amount of lubricant within said housing.

7. An improved tram transmission for mobilizing a mining tram within a mine shaft comprising:
   a motor engaging means for receiving the drive shaft of a motor;
   a speed reducing means connected to said motor engaging means for regulating the speed of said tram, said speed reducing means including a plurality of shafts, a plurality of gears and a plurality of bearings, each of said gears being connected to one of said shafts and having a selected diameter with a selected number of teeth equidistantly spaced about the circumference of said gear, said bearings being located proximate each end of each of said shafts and connected to said housing for limiting the movement of said shafts to rotation about the elongated axis bearings;
   a crawler engaging means connected to said speed reducing means for engaging a caterpillar type chain proximate one side of said mining tram to move said side of said tram along a support surface, said crawler engaging means being positioned proximate said support surface and including a plurality of radially spaced sprockets for engaging proximately the midpoint of the width of said caterpillar type chain; and
   a housing connected to said tram and encasing said motor engaging means and said speed reducing means for protecting said motor engaging means and said speed reducing means from debris and moisture, said housing defining at least first and second lubricant reservoirs, said first lubricant reservoir for receiving a first selected lubricant and said second reservoir for receiving a second selected lubricant, each of said first and second lubricant reservoirs including at least one opening which may be selectively opened and closed whereby said first and second lubricants may be introduced to lubricate said gears and said bearings at least one lubricant seal to prevent said first and second lubricants from leaking from said first and second lubricant reservoirs, and a lubricant gauge for measuring the amount of lubricant within said first and second lubricant reservoirs.

8. The improved tram transmission of claim 7 wherein said housing further includes a means for mounting said motor to prevent said motor from moving substantially in relation to said housing.

9. The improved tram transmission of claim 7 wherein said motor engaging means is provided with a fixing means for preventing said motor from disengaging from said motor engaging means.

10. An improved tram transmission for mobilizing a mining tram within a mine shaft comprising:
    a motor engaging means for receiving the drive shaft of a motor, said motor engaging means including a fixing means for preventing said motor from disengaging from said motor engaging means;
    a speed reducing means connected to said motor engaging means for regulating the speed of said tram, said speed reducing means including a plurality of shafts, a plurality of gears and a plurality of bearings, each of said gears being connected to one of said shafts and having a selected diameter with a selected number of teeth equidistantly spaced about the circumference of said gear, said bearings being located proximate each end of each of said shafts and connected to said housing for limiting the movement of said shafts to rotation about the elongated axis bearings;
    a crawler engaging means connected to said speed reducing means for engaging a caterpillar type chain proximate one side of said mining tram to move said side of said tram along a support surface, said crawler engaging means being positioned proximate said support surface and including a plurality of radially spaced sprockets for engaging proximately the midpoint of the width of said caterpillar type chain; and
    a housing connected to said tram and encasing said motor engaging means and said speed reducing means for protecting said motor engaging means and said speed reducing means from debris said moisture, said housing defining at least first and second lubricant reservoirs, said first lubricant reservoir for receiving a selected lubricant and said second reservoir for receiving a selected lubricant, said housing including at least one opening which may be selectively opened and closed whereby said selected lubricant may be introduced to lubricate said gears and said bearings, at least one lubricant seal to prevent said selected lubricant from leaking from said housing, a lubricant gauge for measuring the amount of said selected lubricant within said housing, and a means for mounting said motor to said housing to prevent said motor from moving substantially in relation to said housing, and said housing further including a selectively detachable member for assembly and service of said motor engaging means and said speed reducing means.

11. The improved tram transmission of claim 7 wherein said housing further includes a selectively detachable member for assembly and service of said motor engaging means and said speed reducing means.

12. The improved tram transmission of claim 1 wherein said housing further includes a selectively detachable member for assembly and service of said motor engaging means and said speed reducing means.

* * * * *